US011535707B1

(12) United States Patent
Paraskos et al.

(10) Patent No.: US 11,535,707 B1
(45) Date of Patent: Dec. 27, 2022

(54) PROCESS FOR PREPARING LIGHT CURABLE ENERGETIC BINDER

(71) Applicant: U.S. Government as Represented by the Secretary of the Army, Dover, NJ (US)

(72) Inventors: Alexander Paraskos, Sparta, NJ (US); Edward D. Cooke, Sussex, NJ (US); Eric R. Beckel, Easton, PA (US)

(73) Assignee: United States of America as Represented by the Secretary of the Army, Washington, DC (US)

( * ) Notice: Subject to any disclaimer, the term of this patent is extended or adjusted under 35 U.S.C. 154(b) by 805 days.

(21) Appl. No.: 16/540,386

(22) Filed: Aug. 14, 2019

Related U.S. Application Data

(60) Provisional application No. 62/718,431, filed on Aug. 14, 2018.

(51) Int. Cl.
| | | |
|---|---|---|
| *C08G 65/332* | (2006.01) | |
| *C08G 65/22* | (2006.01) | |
| *C06B 45/10* | (2006.01) | |
| *C08G 65/333* | (2006.01) | |
| C08G 18/10 | (2006.01) | |
| C08G 18/50 | (2006.01) | |

(52) U.S. Cl.
CPC .......... *C08G 65/332* (2013.01); *C06B 45/105* (2013.01); *C08G 65/22* (2013.01); *C08G 65/3322* (2013.01); *C08G 65/33348* (2013.01); *C08G 18/10* (2013.01); *C08G 18/5021* (2013.01)

(58) Field of Classification Search
CPC .......................... C08G 65/322; C08G 5/33348
See application file for complete search history.

(56) References Cited

U.S. PATENT DOCUMENTS

| 6,103,029 A | 8/2000 | Reed, Jr. | |
| 2008/0188630 A1* | 8/2008 | Paraskos ............... | C06B 45/105 525/453 |

FOREIGN PATENT DOCUMENTS

| CN | 102399352 A | * 4/2012 |
| CN | 111718480 A | * 9/2020 |

OTHER PUBLICATIONS

Ceric ion initiation of Methyl Methacrylate from Poly(glycidyl azide)-diol authored by Arslan et al. and published in the European Polymer Journal (2001) 37, 581-585.*
"Synthesis and Characterization of Energetic GAP-b-PAEMA Block Copolymer" authored by Zhang et al. and published in Polymer Engineering and Science (2012) 768-773.*
Abstract for "isocyanate-free Curing Glycidyl azide Polymer (GAP) with Bis-propargyl Succinate" authored by Keicher et al. and published in Propellants, Explosives, Pyrotechnics (2009) 34(3), 210-217.*
Katritzky, Alan R. et al, "Triazole-oiigomers by 1,3-dipolar cycloaddition", ARKIVOC 2006 (v) 43-62.
Ciaramitaro, David A. et al, "Triazole Linkages as a Route to More Robust Binder Cures", Chemical Propulsion Information Agency, Laurel, 2001, 293-302.
Katritzky, Alan R. et al, "Preparation and characterization of 1,2,3-triazole-cured polymers from endcapped azides and alkynes" Journal of Polymer Science Part A, 2007, vol. 46, Issue 1, 238-256.
Song, Y. et al, "Effect of the crosslink functionality on the mechanical properties of crosslinked 1,2,3-triazole polymers as potential binders for rocket propellants", Journal of Applied Polymer Science, 2010, vol. 117, issue 1, 473-478.
Katritzky, Alan R. et al, "Effect of filler loading on the mechanical properties of crosslinked 1,2,3-triazole polymers" Journal of Applied Polymer Science, 2010, vol. 118, Issue 1, 121-127.
Sonawane, S. et al, "Isocyanate-free curing of glycidyl azide polymer with bis-propargylhydroquinone", Propellants, Explosives and Pyrotechnics, 2017, vol. 42, Issue 4, 386-393.
Opsteen, Joost A. et al, "Modular synthesis of block copolymers via cycloaddition of terminal azide and alkyne functionalized polymers", Chemical Communications, 2005, 57-59.
Oberth, Adolf E., "Principles of Solid Rock Propellant Development", Chemical Propulsion Information Agency, Laurel, MD 1986, 5-6 to 5-18.
Hoyle, C.E.; Bowman, C.N., "Thiol-Ene Click Chemistry", Angew. Chem., Int. Ed. 2010, 49, 1540-1573.
Lowe, A.B., "Thiol-yne 'Click'/Coupling Chemistry and Recent Applications in Polymer and Materials Synthesis and Modification", Polymer, 2014, 55, 5517-5549.
Fairbanks, B.D. et al, "Reacction Rates and Mechanisms for Radical, Photoinitiated Addition of Thiols to Alkynes, and Implications for Thio-Yne Photopolymerizations and Click Reactions", Macromolecules, 2010, 43, 4113-4119.
Fairbanks, B. D. et al "Thiol-Yne Photopolymerizations: Novel Mechanism, Kinetics, and Step-Growth Formation of Highly Crosslinked Networks", Macromolecules, 2009, 42, 211-217.

* cited by examiner

*Primary Examiner* — Marc S Zimmer
(74) *Attorney, Agent, or Firm* — John P. DiScala

(57) ABSTRACT

The present invention is directed to a process for preparing light curable energetic polymeric binders. The process for preparing such binder comprises the steps of mixing a pre-polymer such as PGN or GAP having a terminal hydroxyl group with a solvent and adding reactants wherein the reactant has a light curable moiety and a pre-polymer reactive moiety. Catalysts such as carbodiimide and DMAP may be further added to the mixture.

10 Claims, No Drawings

PROCESS FOR PREPARING LIGHT CURABLE ENERGETIC BINDER

RELATED APPLICATIONS

This application claims the benefit of priority to provisional patent application No. 62/718,431, filed on Aug. 14, 2018 the contents of which are incorporated herein in its entirety.

RIGHTS OF THE GOVERNMENT

The inventions described herein may be manufactured and used by or for the United States Government for government purposes without payment of any royalties.

FIELD OF INVENTION

The present invention relates generally to methods for processing energetic polymers and more specifically to modifying energetic binders for curing with light.

BACKGROUND OF THE INVENTION

Common energetic pre-polymers used in cast-cure explosive and propellant applications typically take the form of terminally-functionalized energetic polyols which are most often cured using polyisocyanate-based curatives. Curing takes place in the presence of a thermally activated catalyst at elevated temperatures over the course of several hours or days. The use of isocyanate curatives does pose several challenges, as the presence of water from atmospheric moisture results in the formation of carbon dioxide which can form voids within the resulting polymer formulation. In addition, many of the isocyanate curatives are toxic and potential carcinogens, and the thermal cures are extremely slow thus limiting their use in various applications. One proposed solution to these problems that was investigated in the past was to use a "triazole cure" methodology in which azide-containing energetic polymers were reacted with small, oligomeric polyacetylenes. These reactions typically require either heating or the use of a metal-based catalyst and do not work for polymers lacking an azide functionality.

Thiol-ene reactions have received renewed attention recently due to the understanding that these materials undergo click-type reactivity employing polythiol curatives and a radical generating photoinitiator. Applications of these materials include, but are not limited to, thin film coatings, adhesives, bio-scaffolds, dental restoratives, and MEMS structures. These materials can be cured via thermal or photopolymerization techniques, and the photopolyermization offers enhanced spatial and temporal control over traditional thermal cured acrylate and urethane chemistries. Thiol-ynes are a sister reaction to the thiol-ene chemistry and offer nearly identical benefits of their thiol-ene brother. First, the thiol-ene and thiol-yne reactions proceed by a step-growth mechanism, which allows for delayed gelation and nearly 100% conversion of reactive species in these systems, even in highly crosslinked situations. This 100% conversion of reactive species reduces or eliminates aging effects associated with the polymer binder. Second, the thiol-ene and thiol-yne types of reactions do not have any side reactions with water that generate unwanted by-products and thus moisture content is no longer an issue. Thirdly, the thiol-ene and thiol-yne reactions are unaffected by oxygen inhibition and therefore expensive nitrogen blanketing during polymerization is not required. This reduced oxygen inhibition means that these systems can be cured in ambient atmospheric conditions without any reduction in the cure kinetics or adverse effects on the final material properties. Finally, it has recently been discovered that thiol-ene and thiol-yne polymers provide a level of fire retardancy in the condensed phase, which may reduce the violence of cook off events and hot fragment initiations in polymer bound explosive and propellant formulations.

SUMMARY OF THE INVENTION

Disclosed herein is a process for preparing light curable energetic polymeric binders. Binders modified using the process described reduces curing time, minimizes unwanted moisture, and avoids introduction of toxic reactants when the binders are cured.

According to one aspect of the invention, the light curable energetic polymeric binder is prepared by combining a pre-polymer such as PGN or GAP having a terminal hydroxyl group in a solvent with a reactant. Such reactants have two functional moieties, one moeity that can react with the terminal hydroxyl group of the pre-polymer and a second light curable moiety. Such light curabable moiety can be either an alkene, alkyne or acrylate compound. The mixture is cooled below 0° C., and processed to recover the light curable energetic polymeric binder.

In another aspect of the invention, the reactant having a pre-polymer reactive moiety is selected from the group consisting of 4-pentynoic acid, 4-pentenoic acid, acrylic acid, acryloyl chloride, acrylic anhydride, and 2-isocyanoethyl acrylate.

In another aspect of the invention, a catalyst may be added to the mixture. Such catalyst may be carbodiimide or DMAP. Exemplary carbodiimides include EDCI, DCC or DIC.

DETAILED DESCRIPTION

The present invention relates to methods for the production of light-curable energetic polymers that function as energetic binders. The pre-polymers are made light-curable by the addition of various alkyne, alkene and acrylate moieties to the terminal hydroxyl groups of the energetic binder themselves. Several new energetic light-curable polymers were synthesized, characterized and tested.

Generally speaking, the alkyne, alkene and acrylate moieties are attached to the polymer chain by joining a reactive group or moiety to the terminal hydroxyl group of the energetic polymer chain. Preferred reactive groups include carboxylic acid (including but not limited to 4-pentynoic acid and 4-pentenoic acid), an acid chloride (including but not limited to acryloyl chloride), an acid anhydride (including but not limited to acrylic anhydride) or an isocyanate (including but not limited to 2-isocyanatoethyl acrylate). In many cases a base or catalyst may be employed to accelerate and/or facilitate the reaction including but not limited to triethylamine, 4-dimethylaminopyridine, N-(3-Dimethylaminopropyl)-N'-ethylcarbodiimide, and dibutyltin dilaurate.

Using the process disclosed herein, alkyne-terminated poly(glycidyl nitrate)(PGN-yne) and poly(glycidyl azide) (GAP-yne) were synthesized. The chemical structure of these compounds are illustrated below.

Structure 1. Alkyne-terminated PGN

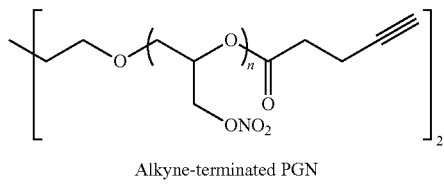

Alkyne-terminated PGN

Structure 2. Alkyne-terminated GAP

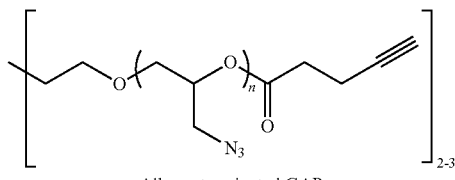

Alkyne-terminated GAP

Alkene polymers such as alkene-terminated poly(glycidyl nitrate) (PGN-ene) (3) and poly(glycidyl azide) (GAP-ene) (4) were also synthesized. The chemical structures of these compounds are shown in Structures 3 and 4:

Structure 3. Alkene-terminated PGN (3)

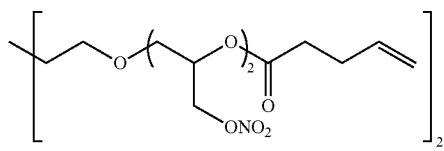

Alkene-terminated PGN

Structure 4. Alkene-terminated GAP (4)

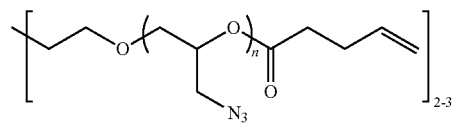

Alkene-terminated GAP

Urethane bound acrylate-terminated polymers such as the PGN variant and the GAP variant were also synthesized. The structure for these molecules are illustrated below.

Structure 5. Urethane acrylate-terminated PGN (5)

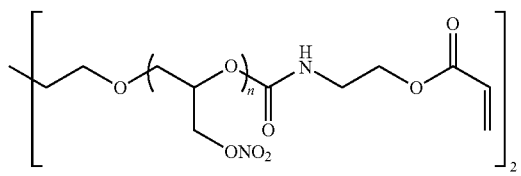

Urethane acrylate-terminated PGN

Structure 6. Urethane bound acrylate-terminated GAP (6)

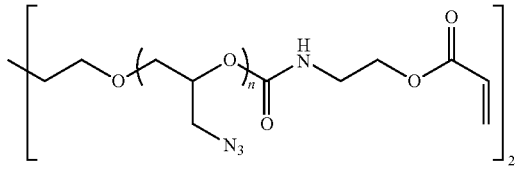

Urethane acrylate-terminated GAP

Structure 7. Acrylate-terminated PGN (7)

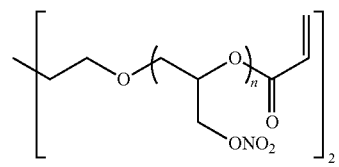

Acrylate-terminated PGN

Structure 8. Acrylate-terminated GAP (8)

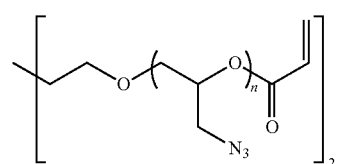

Acrylate-terminated GAP

Other energetic pre-polymers which are hydroxyl terminated including, but not limited to PNO, poly-BAMO, poly-AMMO, poly-NMMO, and BN-7. Such pre-polymers may be end capped with light curable reactants and pre-polymer reactive moieties using the process disclosed herein. Examples of light curable reactants include alkenes, alkynes or acrylates. Examples of pre-polymer reactive moieties include carboxylic acids such as 4-pentynoic acid and 4-pentenoic acid, acrylic acid, as well as acryloyl chloride, acrylic anhydride, and 2-isocyanatoethyl acrylate.

EXAMPLES

Example 1: Synthesis of Bis-(4-Pentynoyl)-poly (glycidyl nitrate) [i.e.—Alkyne-Terminated PGN) (1)]

A 5000-ml jacketed reactor was equipped with an overhead stirrer, thermocouple, gas inlet and addition funnel. The reactor was flushed with argon and then charged with a solution of 140.0 g nominally difunctional poly(glycidyl nitrate) (PGN) of MW=2300-2400 g/mol in dichloromethane (1200 ml). Using a powder addition funnel 4-pentynoic acid (14.62 g, 149.1 mmol) was added to the stirred solution followed by DMAP (19.335 g, 158.3 mmol). The funnel was rinsed with 450 ml dichloromethane. The reactor was cooled to a jacket temperature of −20° C. Using an addition funnel a solution of N-(3-Dimethylaminopropyl)-N'-ethylcarbodiimide (EDCI) (25.9 ml, 22.68 g, 146.2 mmol) in 600 ml dichloromethane was added dropwise with stirring keeping the temperature below 0° C. Once the addition was complete the reactor was warmed to room temperature and stirred for 18 h. The organic solution was washed twice with 700 ml each of 1M aqueous NaOH. The organic solution was washed twice with 700 ml each of 2M aqueous HCl. The organic solution was washed twice with 700 ml each of a saturated aqueous solution of NaHCO$_3$. The organic solution was dried over magnesium sulfate powder, filtered to remove the drying agent and isolated by rotary evaporation. Approximately 135 g (90%) of product was isolated as an amber viscous liquid.

Example 2: Synthesis of Bis-(4-Pentynoyl)-glycidyl azide polymer [i.e.—Alkyne-Terminated GAP (2)]

A 500 ml 3-necked round-bottom flask was equipped with a stir bar, thermocouple, addition funnel and gas inlet. The reactor was flushed with argon and charged with a solution of GAP Polyol (GAP-5527) (10.0 g) in 120 ml of dichloromethane. Using a powder addition funnel 4-pentynoic acid (603 mg, 6.15 mmol) was added to the stirred solution followed by DMAP (794 mg, 6.50 mmol). The funnel was rinsed with 20 ml dichloromethane. The reactor was with an ice/CaCl$_2$ bath to −5° C. Using an addition funnel a solution of N-(3-Dimethylaminopropyl)-N'-ethylcarbodiimide (EDCI) (1.062 ml, 932 mg, 6.0 mmol) in 50 ml dichloromethane was added dropwise with stirring keeping the temperature below 0° C. Once the addition was complete the reactor was warmed to room temperature and stirred for 18 h. The organic solution was washed twice with 50 ml each of 1M aqueous NaOH. The organic solution was washed twice with 50 ml each of 2M aqueous HCl. The organic solution was washed twice with 50 ml each of a saturated aqueous solution of NaHCO$_3$. The organic solution was dried over magnesium sulfate powder, filtered to remove the drying agent and isolated by rotary evaporation. Approximately 135 g (90%) of product was isolated as an amber viscous liquid.

Example 3: Synthesis of Bis-(4-Pentenoyl)-poly (glycidyl nitrate) [i.e.—Alkene-Terminated PGN (3)]

A 1000 ml 3-necked round-bottom flask was equipped with a stir bar, thermocouple, addition funnel and gas inlet. The reactor was flushed with argon and charged with a solution of PGN (25.0 g) in 120 ml of dichloromethane. Using a powder addition funnel 2.72 ml of 4-pentenoic acid (2.67 g, 26.63 mmol, 2.45 eq) was added to the stirred solution followed by DMAP (3.45 g, 28.3 mmol, 2.6 eq). The funnel was rinsed with 20 ml dichloromethane. The reactor was cooled with an ice/CaCl$_2$ bath to −5° C. Using an addition funnel N-(3-Dimethylaminopropyl)-N'-ethylcarbodiimide (EDCI) (4.62 ml, 4.05 g, 26.09 mmol) dissolved in 110 ml of dichloromethane was added dropwise with stirring keeping the reaction temperature below 0° C. Once the addition was complete the reactor was warmed to room temperature and stirred for 18 h. The organic solution was washed twice with 125 ml each of 1M aqueous NaOH. The organic solution was washed twice with 125 ml each of 2M aqueous HCl. The organic solution was washed twice with 125 ml each of a saturated aqueous solution of NaHCO$_3$. The organic solution was dried over magnesium sulfate powder, filtered to remove the drying agent and isolated by rotary evaporation. Approximately 21.13 g (78%) of product (3) was isolated as an amber viscous liquid.

Example 4: Synthesis of Bis(urethane bound acrylate)-Terminated PGN (5)

A 250-ml 3-neck round-bottom flask was equipped with a stir bar, thermocouple and gas inlet. The reactor was purged with argon and then charged with a solution of PGN (5.0 g, 4.35 mmol) in 50 mL dichloromethane. The transfer container was rinsed with 50 ml dichloromethane which was subsequently added to the reaction vessel. The solution was cooled with stirring to <5° C. with an ice bath. A solution of 2-isocyanatoethyl acrylate (1.35 g, 9.57 mmol, 2.2 eq) in 40 ml of dichloromethane was added dropwise to the PGN solution maintaining the temperature <5° C. Upon completion of addition, the reaction was allowed to stir to room temperature and stirred overnight. The organics were then washed with 50 ml of deionized water, separated, and dried over magnesium sulfate. The drying agent was removed by filtration and the product isolated by rotary evaporation. Approximately 3.6 g (72%) of product (5) was isolated as an amber viscous liquid.

Example 5: Synthesis of Bis(urethane bound acrylate)-Terminated GAP (6)

A 250-ml 3-neck round-bottom flask was equipped with a stir bar, thermocouple and gas inlet. The reactor was purged with argon and then charged with a solution of GAP-polyl (10.0 g, 5.0 mmol eq of hydroxyl groups) in 50 mL dichloromethane. The transfer container was rinsed with 50 ml dichloromethane which was subsequently added to the reaction vessel. The solution was cooled with stirring to <5° C. with an ice bath. A solution of 2-isocyanatoethyl acrylate (776 mg, 5.50 mmol, 1.1 eq) in 50 ml of dichloromethane was added dropwise to the GAP solution maintaining the temperature <5° C. Upon completion of addition, the reaction was allowed to stir to room temperature and stirred overnight. The organics were then washed with 50 ml of deionized water, separated, and dried over magnesium sulfate. The drying agent was removed by filtration and the product isolated by rotary evaporation. Approximately 7.8 g (78%) of product was isolated as an amber viscous liquid.

Example 6: Synthesis of Acrylate-Terminated PGN (7)

PGN (20.7 g) was dissolved in 100 ml dichloromethane and added to a 250 ml 3-necked round-bottom flask equipped with a stir bar, gas inlet, septum and thermocouple. The flask was purged with argon and then cooled with an ice/water bath to <5° C. Acryloyl chloride (1.62 mL, 1.79 g, 19.8 mmol, 2.2 eq) was added via syringe. Triethylamine (2.89 ml, 2.10 g, 1.15 eq) was added dropwise with stirring, keeping the temperature below <10° C. Let warm to room temperature and stir overnight. The solution of PGN was then washed with 50 ml of deionized water followed by 2×35 ml of saturated aqueous sodium bicarbonate, dried over magnesium sulfate, filtered to remove the drying agent, and isolated on a rotary evaporator.

Example 7: Light-Curing of Urethane Bound Acrylate-Terminated PGN (5)

Pentaerythritol tetrakis(3-mercaptopropionate) (0.171 g, 0.35 mmol, 1.15 functional eq.) and TPO solid (0.029 g, 1.5% wt to polymer) were added to (5) (1.690 g, 0.60 mmol) in a "max-10" polypropylene cup. The sample was mixed in a countercentrifigul Speedmixer at 1500, 2000, and 3000 rpms for 30 seconds at each speed. A Paradigm LED curing light (430-480 nm) was shone over the sample for two minutes to complete the cure. The final material was a slightly tacky, flexible rubber.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description but by the claims and any equivalents.

What is claimed is:

1. A process for preparing light curable energetic polymeric binder comprising:
    a. combining a pre-polymer, wherein the pre-polymer is polyglycidyl nitrate (PGN) having a terminal hydroxyl group or polyglycidyl azide (GAP) having a terminal hydroxyl group, with a solvent wherein said solvent is dichloromethane, acetone or tetrahydrofuran to form a mixture;
    b. adding a reactant having a pre-polymer reactive moiety and a light curable moiety wherein said light curable moiety is an alkene, alkyne or acrylate to the mixture;
    c. cooling the mixture to below 0° C.;
    d. warming the mixture to room temperature; and
    e. recovering the formed light curable energetic polymer.

2. The process of claim 1, wherein the reactant having a pre-polymer reactive moiety is selected from the group consisting of 4-pentynoic acid, 4-pentenoic acid, acrylic acid, acryloyl chloride, acrylic anhydride, and 2-isocyanatoethyl acrylate.

3. The process of claim 2, wherein a catalyst is added to the mixture.

4. The process of claim 3, wherein the catalyst is a carbodiimide.

5. The process of claim 3, wherein the carbodiimide is N-(3-Dimethylaminopropyl)-N'-ethylcarbodiimide (EDCI), dicyclohexylcarbodiimide (DCC), or N,N'-Diisopropylcarbodiimide (DIC).

6. The process of claim 3, wherein the catalyst is EDCI or 4-Dimethylaminopyridine (DMAP).

7. The process of claim 1, wherein the reactant having a prep-polymer reactive moiety is a carboxylic acid.

8. The process of claim 7, wherein the carboxylic acid is 4-pentynoic or 4-pentenoic acid.

9. A process for preparing light curable energetic polymer binder comprising:
    a. combining a pre-polymer, wherein the pre-polymer is polyglycidyl nitrate (PGN) having a terminal hydroxyl group or polyglycidyl azide (GAP) having a terminal hydroxyl group, with a solvent wherein said solvent is dichloromethane, acetone or tetrahydrofuran to form a mixture;
    b. adding a reactant having pre-polymer reactive moiety, wherein the pre-polymer reactive moiety is a carboxylic acid and a light curable moiety wherein said light curable moiety is an alkene, alkyne or acrylate to the mixture;
    c. cooling the mixture to below 0° C.;
    d. adding a catalyst to the mixture wherein the catalyst is a carbodiimide or DMAP;
    e. warming the mixture to room temperature; and
    f. recovering the formed light curable energetic polymer.

10. A process for preparing light curable energetic polymer binder comprising:
    a. combining a pre-polymer, wherein the pre-polymer is polyglycidyl nitrate (PGN) having a terminal hydroxyl group or polyglycidyl azide (GAP) having a terminal hydroxyl group, with a solvent wherein said solvent is dichloromethane, acetone or tetrahydrofuran to form a mixture;
    b. adding a reactant having pre-polymer reactive moiety, wherein the pre-polymer reactive moiety is a acryloyl chloride, acrylic anhydride, or 2-isocyanatoethyl acrylate and a light curable moiety wherein said light curable moiety is an alkene, alkyne or acrylate to the mixture;
    c. cooling the mixture to below 0° C.;
    d. warming the mixture to room temperature; and
    e. recovering the formed light curable energetic polymer.

* * * * *